(12) United States Patent
Bohler et al.

(10) Patent No.: US 10,598,882 B2
(45) Date of Patent: Mar. 24, 2020

(54) ARMORED FIBER OPTIC ASSEMBLIES AND METHODS OF FORMING FIBER OPTIC ASSEMBLIES

(71) Applicant: Corning Optical Communications LLC, Hickory, NC (US)

(72) Inventors: Gregory Blake Bohler, Lenoir, NC (US); Julian Latelle Greenwood, III, Hickory, NC (US); Keith Aaron Greer, Morganton, NC (US); Wesley Brian Nicholson, Hickory, NC (US); Kimberly Dawn Slan, Ft. Worth, TX (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/289,010

(22) Filed: Feb. 28, 2019

(65) Prior Publication Data

US 2019/0196125 A1 Jun. 27, 2019

Related U.S. Application Data

(63) Continuation of application No. 12/768,158, filed on Apr. 27, 2010, now abandoned.

(60) Provisional application No. 61/174,059, filed on Apr. 30, 2009.

(51) Int. Cl.
*G02B 6/44* (2006.01)
(52) U.S. Cl.
CPC .................. *G02B 6/4435* (2013.01)

(58) Field of Classification Search
CPC ................................... G02B 6/4435
See application file for complete search history.

(56) References Cited

U.S. PATENT DOCUMENTS

| | | |
|---|---|---|
| 2,308,274 A | 1/1943 | Frederickson |
| 4,181,647 A | 1/1980 | Beach |
| 4,232,935 A | 11/1980 | Rohner et al. |
| 4,337,923 A | 7/1982 | Smith |

(Continued)

FOREIGN PATENT DOCUMENTS

| | | |
|---|---|---|
| CN | 87103827 A | 6/1988 |
| DE | 2404909 A | 8/1974 |

(Continued)

OTHER PUBLICATIONS

First Office Action for Chinese Patent Application No. 200910209613.5 dated Aug. 31, 2012, 7 pages.

(Continued)

*Primary Examiner* — Andrew Jordan
(74) *Attorney, Agent, or Firm* — William D. Doyle

(57) ABSTRACT

Cables have dielectric armor with an armor profile that resembles conventional metal armored cable. The armor can be formed as a single layer, without requiring an outer jacket layer. The dielectric armor provides additional crush and impact resistance for the optical fibers and/or fiber optic assembly therein. The armored cables recover substantially from deformation caused by crush loads. Additionally, the armored fiber optic assemblies can have any suitable flame and/or smoke rating for meeting the requirements of the intended space. The assemblies can additionally be lightweight and relatively inexpensive to manufacture.

20 Claims, 8 Drawing Sheets

(56) References Cited

U.S. PATENT DOCUMENTS

| | | |
|---|---|---|
| 4,510,346 A | 4/1985 | Bursh et al. |
| 4,568,144 A | 2/1986 | Occhini et al. |
| 4,743,085 A | 5/1988 | Jenkins et al. |
| 4,814,133 A | 3/1989 | Matsuno et al. |
| 4,946,237 A | 8/1990 | Arroyo et al. |
| 5,126,167 A | 6/1992 | Matsuno et al. |
| 5,189,719 A | 2/1993 | Coleman et al. |
| 5,192,834 A | 3/1993 | Yamanishi et al. |
| 5,305,411 A | 4/1994 | Arroyo |
| 5,340,326 A | 8/1994 | LeMaster |
| 5,615,293 A | 3/1997 | Sayegh |
| 5,719,353 A | 2/1998 | Carlson et al. |
| 5,857,046 A | 1/1999 | Barkus et al. |
| 5,892,873 A | 4/1999 | Tatat |
| 5,920,671 A | 7/1999 | Smith |
| 6,108,475 A | 8/2000 | Chapin et al. |
| 6,233,384 B1 | 5/2001 | Sowell, III et al. |
| 6,404,962 B1 | 6/2002 | Hardwick, III et al. |
| 6,546,176 B2 | 4/2003 | Anderson et al. |
| 6,636,673 B2 | 10/2003 | Register et al. |
| 6,898,354 B2 | 5/2005 | Kim et al. |
| 6,906,264 B1 | 6/2005 | Grant et al. |
| 6,909,264 B2 | 6/2005 | Del Gatto et al. |
| 7,025,509 B2 | 4/2006 | Martin |
| 7,064,276 B2 | 6/2006 | Sakabe et al. |
| 7,092,605 B2 | 8/2006 | Adams et al. |
| 7,196,272 B2 | 3/2007 | Glew |
| 7,202,418 B2 | 4/2007 | Glew |
| 7,266,886 B2 | 9/2007 | Estienne et al. |
| 7,313,304 B2 | 12/2007 | Andrews et al. |
| 7,336,873 B2 | 2/2008 | Lail et al. |
| 7,397,992 B1 * | 7/2008 | Blazer ............ G02B 6/4433 385/106 |
| 7,702,203 B1 | 4/2010 | Bohler et al. |
| 7,742,667 B2 | 6/2010 | Paschal et al. |
| 7,844,148 B2 | 11/2010 | Jenkins et al. |
| 7,845,069 B2 | 12/2010 | Franklin et al. |
| 7,880,089 B1 | 2/2011 | Herrin |
| 7,941,021 B2 * | 5/2011 | Cody ............... G02B 6/4475 385/100 |
| 8,218,925 B2 | 7/2012 | Bohler et al. |
| 8,331,748 B2 | 12/2012 | Register, III |
| 8,428,406 B2 * | 4/2013 | Bohler ............ G02B 6/443 385/107 |
| 8,463,095 B2 * | 6/2013 | Bohler ............ G02B 6/4429 385/100 |
| 8,494,328 B2 | 7/2013 | Register, III |
| 8,554,039 B2 * | 10/2013 | Benjamin ............ C03C 3/06 385/128 |
| 8,582,939 B2 * | 11/2013 | Gimblet ............ G02B 6/4495 385/100 |
| 8,620,124 B1 * | 12/2013 | Blazer ............ G02B 6/4489 385/102 |
| 8,649,644 B2 * | 2/2014 | Greenwood, III ... G02B 6/4495 385/107 |
| 8,687,930 B2 * | 4/2014 | McDowell ......... G02B 6/4411 385/109 |
| 8,724,947 B2 * | 5/2014 | Bohler ............ G02B 6/4429 385/100 |
| 8,737,787 B2 * | 5/2014 | Gimblet ............ G02B 6/4495 385/100 |
| 8,798,417 B2 * | 8/2014 | Blazer ............ G02B 6/4489 385/112 |
| 8,805,142 B2 * | 8/2014 | McDowell ......... G02B 6/4411 385/109 |
| 8,909,014 B2 * | 12/2014 | Gimblet ............ G02B 6/4495 264/1.29 |
| 8,965,160 B2 * | 2/2015 | Greenwood, III ... G02B 6/4411 385/109 |
| 8,995,809 B2 * | 3/2015 | Gimblet ............ G02B 6/4495 385/100 |
| 9,069,147 B2 * | 6/2015 | Greenwood, III ... G02B 6/4411 385/109 |
| 9,073,243 B2 * | 7/2015 | Gimblet ............ B29C 48/154 |
| 9,091,830 B2 * | 7/2015 | Blazer ............ G02B 6/4413 |
| 9,097,875 B1 * | 8/2015 | Blazer ............ G02B 6/4489 |
| 9,140,867 B1 * | 9/2015 | Sandate Aguilar .. G02B 6/4435 |
| 9,170,390 B2 * | 10/2015 | Bohler ............ G02B 6/4486 |
| 9,182,565 B2 * | 11/2015 | Gimblet ............ G02B 6/4405 |
| 9,201,208 B2 * | 12/2015 | Gimblet ............ G02B 6/4495 |
| 9,207,421 B2 | 12/2015 | Conner |
| 9,274,302 B2 * | 3/2016 | Gimblet ............ G02B 6/4434 |
| 9,323,022 B2 * | 4/2016 | Bringuier ............ G02B 6/443 |
| 9,389,382 B2 * | 7/2016 | Blazer ............ G02B 6/4403 |
| 9,435,972 B2 * | 9/2016 | Blazer ............ G02B 6/4489 |
| 9,459,422 B2 * | 10/2016 | Gimblet ............ G02B 6/4429 |
| 9,477,057 B2 * | 10/2016 | Bringuier ............ G02B 6/02357 |
| 9,482,837 B2 * | 11/2016 | Bringuier ............ G02B 6/02357 |
| 9,482,839 B2 * | 11/2016 | Sandate Aguilar .. G02B 6/4494 |
| 9,494,755 B2 * | 11/2016 | Bringuier ............ G02B 6/02357 |
| 9,594,226 B2 * | 3/2017 | Blazer ............ G02B 6/4432 |
| 9,658,422 B2 * | 5/2017 | Gimblet ............ B29C 48/154 |
| 9,664,872 B2 * | 5/2017 | Gimblet ............ G02B 6/4433 |
| 9,703,065 B2 * | 7/2017 | Gimblet ............ G02B 6/4495 |
| 9,720,194 B2 * | 8/2017 | Gimblet ............ G02B 6/4429 |
| 9,720,202 B2 * | 8/2017 | Bringuier ............ G02B 6/4495 |
| 9,733,443 B2 * | 8/2017 | Blazer ............ G02B 6/4489 |
| 9,791,652 B2 * | 10/2017 | Aguilar ............ G02B 6/4488 |
| 9,927,588 B2 * | 3/2018 | Blazer ............ G02B 6/4432 |
| 9,971,101 B2 * | 5/2018 | Bringuier ............ G02B 6/02357 |
| 10,078,191 B2 * | 9/2018 | Blazer ............ G02B 6/4403 |
| 10,126,517 B2 * | 11/2018 | Clampitt ............ G02B 6/4432 |
| 10,228,529 B2 * | 3/2019 | Gimblet ............ G02B 6/4495 |
| 10,254,494 B2 * | 4/2019 | Gimblet ............ G02B 6/4434 |
| 2001/0007604 A1 | 7/2001 | Lail |
| 2002/0126970 A1 | 9/2002 | Anderson et al. |
| 2003/0111768 A1 * | 6/2003 | Estienne ............ H01B 13/0009 264/286 |
| 2003/0161596 A1 | 8/2003 | Register, III et al. |
| 2003/0202756 A1 | 10/2003 | Hurley et al. |
| 2004/0075422 A1 * | 4/2004 | Del Gatto ............ G05F 3/242 323/282 |
| 2004/0120663 A1 | 6/2004 | Lail et al. |
| 2004/0151448 A1 | 8/2004 | Adams et al. |
| 2005/0013573 A1 | 1/2005 | Lochkovic et al. |
| 2005/0098342 A1 | 5/2005 | Sakabe et al. |
| 2005/0196113 A1 | 9/2005 | Hurley et al. |
| 2005/0199415 A1 * | 9/2005 | Glew ............... G02B 6/4429 174/113 C |
| 2006/0029340 A1 | 2/2006 | Andrews et al. |
| 2006/0096777 A1 * | 5/2006 | Glew ............... H01B 11/04 174/113 C |
| 2006/0280413 A1 | 12/2006 | Paschal et al. |
| 2007/0209825 A1 | 9/2007 | Glew |
| 2008/0253723 A1 | 10/2008 | Stokes et al. |
| 2009/0139084 A1 | 6/2009 | Franklin et al. |
| 2010/0092129 A1 * | 4/2010 | Conner ............... G02B 6/4452 385/17 |
| 2010/0162770 A1 * | 7/2010 | Bohler ............ G02B 6/4429 65/401 |
| 2010/0260459 A1 | 10/2010 | Bohler et al. |
| 2010/0278492 A1 * | 11/2010 | Bohler ............ G02B 6/4435 385/107 |
| 2011/0075980 A1 | 3/2011 | Register, III |
| 2011/0262087 A1 | 10/2011 | Bohler et al. |
| 2011/0286706 A1 * | 11/2011 | Greenwood, III ... G02B 6/4495 385/107 |
| 2012/0251061 A1 | 10/2012 | Bohler et al. |
| 2013/0071075 A1 * | 3/2013 | Register, III ........ G02B 6/4429 385/113 |
| 2013/0216192 A1 * | 8/2013 | Gimblet ............ G02B 6/4495 385/100 |
| 2013/0236148 A1 * | 9/2013 | Bohler ............ G02B 6/4429 385/103 |
| 2013/0259435 A1 * | 10/2013 | Bohler ............ G02B 6/4435 385/108 |
| 2014/0029902 A1 * | 1/2014 | Gimblet ............ G02B 6/4495 385/100 |
| 2014/0086543 A1 * | 3/2014 | Blazer ............ G02B 6/4489 385/112 |
| 2014/0153887 A1 * | 6/2014 | McDowell ......... G02B 6/4411 385/114 |

(56) References Cited

U.S. PATENT DOCUMENTS

| | | | | |
|---|---|---|---|---|
| 2014/0212101 A1* | 7/2014 | Bringuier | ............ | G02B 6/02357 385/113 |
| 2014/0241678 A1* | 8/2014 | Bringuier | ............ | G02B 6/02357 385/113 |
| 2014/0328564 A1* | 11/2014 | Greenwood, III | ... | G02B 6/4411 385/114 |
| 2014/0348481 A1* | 11/2014 | Giraud | ................. | G02B 6/3825 385/135 |
| 2015/0043874 A1* | 2/2015 | Sandate Aguilar | .. | G02B 6/4432 385/100 |
| 2015/0049993 A1* | 2/2015 | Gimblet | ............... | G02B 6/4495 385/100 |
| 2015/0086168 A1* | 3/2015 | Blazer | .................. | G02B 6/4413 385/102 |
| 2015/0110451 A1* | 4/2015 | Blazer | .................. | G02B 6/4432 385/103 |
| 2015/0125121 A1* | 5/2015 | Greenwood, III | ... | G02B 6/4411 385/114 |
| 2015/0205063 A1* | 7/2015 | Blazer | .................. | G02B 6/4489 385/100 |
| 2015/0241652 A1* | 8/2015 | Blazer | .................. | G02B 6/4489 385/103 |
| 2015/0253526 A1* | 9/2015 | Sandate Aguilar | .. | G02B 6/4433 385/103 |
| 2015/0268439 A1* | 9/2015 | Gimblet | ................ | B29C 48/154 385/102 |
| 2015/0293321 A1* | 10/2015 | Blazer | .................. | G02B 6/4489 385/101 |
| 2015/0346445 A1* | 12/2015 | Blazer | .................. | G02B 6/4403 385/114 |
| 2015/0355426 A1* | 12/2015 | Aguilar | .................. | G02B 6/441 385/110 |
| 2015/0355430 A1* | 12/2015 | Clampitt | .............. | G02B 6/4432 385/103 |
| 2016/0011392 A1* | 1/2016 | Bohler | ................... | G02B 6/443 264/1.28 |
| 2016/0161698 A1* | 6/2016 | Gimblet | ............... | G02B 6/4434 385/100 |
| 2016/0170165 A1* | 6/2016 | Gimblet | ............... | G02B 6/4495 83/27 |
| 2016/0178864 A1* | 6/2016 | Bringuier | ............. | G02B 6/4495 385/100 |
| 2016/0216468 A1* | 7/2016 | Gimblet | ............... | G02B 6/4436 |
| 2016/0266342 A1* | 9/2016 | Ellis | ........................ | G02B 6/441 |
| 2016/0306130 A1* | 10/2016 | Bringuier | ............. | G02B 6/4433 |
| 2016/0377824 A1* | 12/2016 | Gimblet | ................ | G02B 6/443 385/104 |
| 2017/0031107 A1* | 2/2017 | Bringuier | ........... | G02B 6/02357 |
| 2017/0131496 A1* | 5/2017 | Blazer | .................... | G02B 6/449 |
| 2017/0139167 A1* | 5/2017 | Blazer | ................... | G02B 6/4403 |
| 2017/0146757 A1* | 5/2017 | Blazer | ................... | G02B 6/4432 |
| 2017/0269323 A1* | 9/2017 | Gimblet | ............... | G02B 6/4495 |
| 2018/0003914 A1* | 1/2018 | Gimblet | ................ | B29C 48/154 |
| 2018/0011274 A1* | 1/2018 | Gimblet | ................ | G02B 6/441 |
| 2018/0180831 A1* | 6/2018 | Blazer | ................... | G02B 6/4432 |
| 2018/0231729 A1* | 8/2018 | Baetz | ................... | G02B 6/4435 |
| 2018/0356608 A1* | 12/2018 | Cheng | .................... | G02B 6/443 |
| 2019/0049686 A1* | 2/2019 | Clampitt | ............... | G02B 6/4432 |
| 2019/0154943 A1* | 5/2019 | Gimblet | ................ | G02B 6/4495 |
| 2019/0196124 A1* | 6/2019 | Aguilar | ................ | G02B 6/4435 |
| 2019/0196125 A1* | 6/2019 | Bohler | ................. | G02B 6/4435 |

FOREIGN PATENT DOCUMENTS

| | | |
|---|---|---|
| JP | 11-223752 A | 8/1999 |
| RU | 2199142 C1 | 2/2003 |
| WO | WO 93/09457 | 5/1993 |
| WO | WO 95/35196 | 12/1995 |

OTHER PUBLICATIONS

First Office Action for Chinese Patent Application No. 201010146116. 8. dated Nov. 12, 2012, 5 pages.

Non-Final Office Action for U.S. Appl. No. 13/494,129 dated Aug. 16, 2012, 7 pages.

Non-Final Office Action for U.S. Appl. No. 12/718,044 dated Jan. 6, 2012, 12 pages.

Non-Final Office Action for U.S. Appl. No. 12/261,645 dated Oct. 6, 2009, 13 pages.

Non-Final Office Action for U.S. Appl. No. 12/748,925 dated Jul. 24, 2012, 13 pages.

Non-Final Office Action for U.S. Appl. No. 13/673,203 dated Feb. 1, 2013, 9 pages.

Notice of Allowance for U.S. Appl. No. 13/494,129 dated Oct. 29, 2012, 9 pages.

Notice of Allowance for U.S. Appl. No. 12/718,044 dated Apr. 6, 2012, 8 pages.

Notice of Allowance for U.S. Appl. No. 12/261,645 dated Feb. 12, 2010, 8 pages.

Notice of Allowance for U.S. Appl. No. 12/748,925 dated Nov. 27, 2012, 9 pages.

Notice of Allowance for U.S. Appl. No. 12/888,865 dated Sep. 19, 2012, 9 pages.

Restriction Requirement for U.S. Appl. No. 12/261,645 dated Jun. 26, 2009, 9 pages.

Restriction Requirement for U.S. Appl. No. 12/748,925 dated Apr. 27, 2012, 6 pages.

* cited by examiner

ARMORED FIBER OPTIC ASSEMBLIES AND METHODS OF FORMING FIBER OPTIC ASSEMBLIES

PRIORITY APPLICATION

This application is a continuation of U.S. application Ser. No. 12/768,158, filed Apr. 27, 2010, which claims the benefit of U.S. Provisional Application No. 61/174,059, filed Apr. 30, 2009, the entire contents of both are hereby incorporated by reference.

RELATED APPLICATIONS

This application is related to U.S. application Ser. No. 12/261,645, filed Oct. 30, 2008, issued as U.S. Pat. No. 7,702,203 on Apr. 20, 2010, to U.S. Prov. App. 61/168,005, filed Apr. 9, 2009, and to U.S. application Ser. No. 12/748,925, filed Mar. 29, 2010, the entire contents of which are hereby incorporated by reference.

TECHNICAL FIELD

The present disclosure relates to optical fiber assemblies, and in particular relates to fiber optic assemblies having dielectric armor.

BACKGROUND

Fiber optic cables and assemblies should preserve optical performance when deployed in the intended environment while also satisfying any other requirements for the environment. Indoor cables for riser and/or plenum spaces, for example, may require certain flame-retardant ratings as well as mechanical requirements. Mechanical characteristics such as crush performance, permissible bend radii, and temperature performance in part determine how installation and use of the cable in the installation space affect optical performance of the cable.

Certain conventional indoor riser applications use a fiber optic cable disposed within a metallic interlocking armor layer. "BX armor" or "Type AC" cables utilize such armors. BX armor is wound spirally about the fiber optic cable so that the edges of the adjacent wraps of armor mechanically interlock to form an armor layer. Interlocking armors are robust but expensive to install. In particular, the metallic armor must be grounded in order to meet electrical safety standards. FIG. 1 shows several prior art examples of interlocking armored cables 10 having a metallic (typically aluminum) armor layer 12. The metallic armor layer 12 must be grounded, for example, in order to comply with the National Electrical Code (NFPA 120) safety standard. Additionally, the metallic armor 12 can be plastically deformed (i.e., permanently deformed) under crush loads, which can pinch the cable and cause permanently elevated levels of optical attenuation that remain after the crush load is released.

Manufacturers have attempted to design dielectric armor cables to overcome the drawbacks of conventional metallic armor constructions. U.S. Pat. No. 7,064,276 discloses a dielectric armor cable having two synthetic resin layers where the hard resin layer has a continuous spiral groove cut completely through the hard resin layer along the length of the armor. The hard adjoining edge portions of the spiral groove abut to inhibit bending below a certain radius. However, one skilled in the art would recognize this design does not provide the craft with all of the desired features. Moreover, it can be difficult for the craft to recognize the cable of the '276 patent as an armored cable layered because it has a smooth outer surface, whereas conventional metal armored cables as depicted by FIG. 1 are easily identified by the craft.

SUMMARY

The disclosure is directed to armored fiber optic assemblies having a dielectric armor and methods for manufacturing cables having dielectric armor. The dielectric armor can have an armor profile resembling conventional metal armored cables. The dielectric armor provides crush and impact resistance to the optical fibers and/or fiber optic assembl(ies) therein. After being subjected to crush loads, the dielectric armor recovers to substantially recover or to wholly recover its original shape. The dielectric armor is also advantageous in that it provides desired mechanical performance without requiring the time and expense of grounding during installation.

According to another aspect of the present embodiments, the armored fiber optic assemblies can have suitable flame and/or smoke ratings for spaces such as plenum and riser applications.

According to yet another aspect of the present embodiments, an exterior cable jacket can be omitted from the armored fiber optic assemblies to reduce manufacturing time. The cost of materials used to form the assemblies is also reduced.

It is to be understood that both the foregoing general description and the following detailed description present embodiments of the invention, and are intended to provide an overview or framework for understanding the nature and character of the invention as it is claimed.

BRIEF DESCRIPTION OF THE DRAWINGS

The accompanying drawings are included to provide further understanding of the invention. The drawings illustrate the various example embodiments of the invention and, together with the description, serve to explain the principals and operations of the invention.

DETAILED DESCRIPTION

Figure 1:
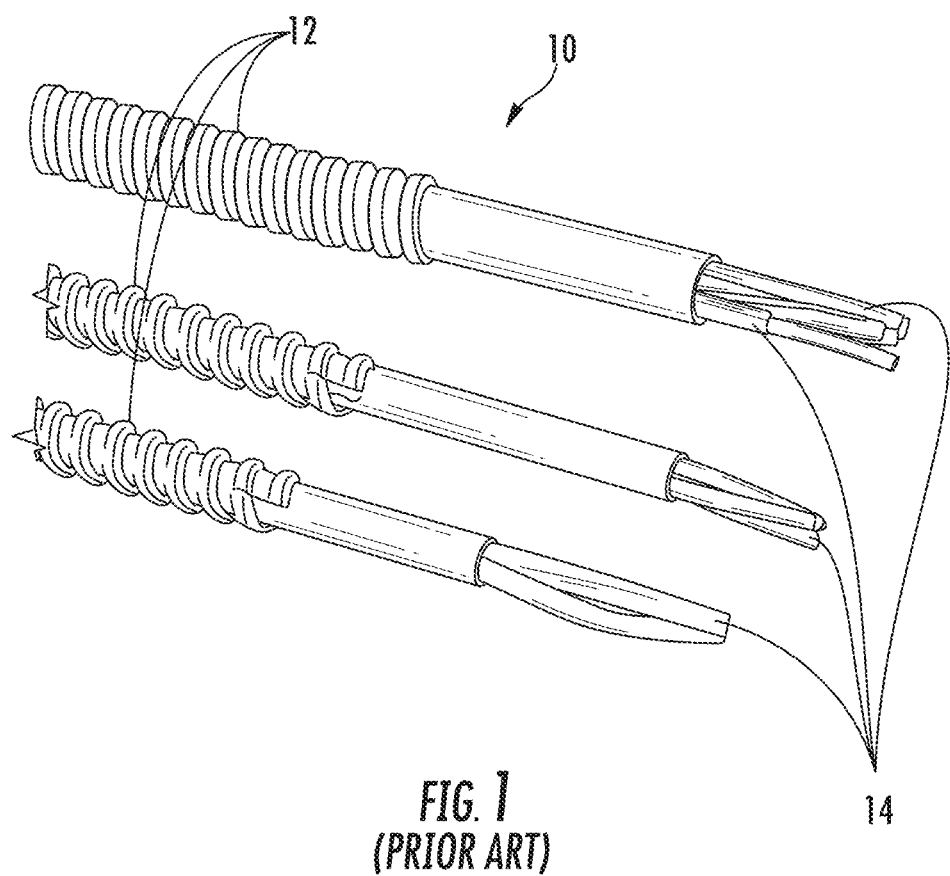
FIG. 1 is a perspective view of three different prior art interlocking armor cables.

Reference is now made in detail to exemplary embodiments of the invention, examples of which are illustrated in the accompanying drawings. Whenever possible, identical or similar reference numerals are used throughout the drawings to refer to identical or similar parts.

Figure 2:
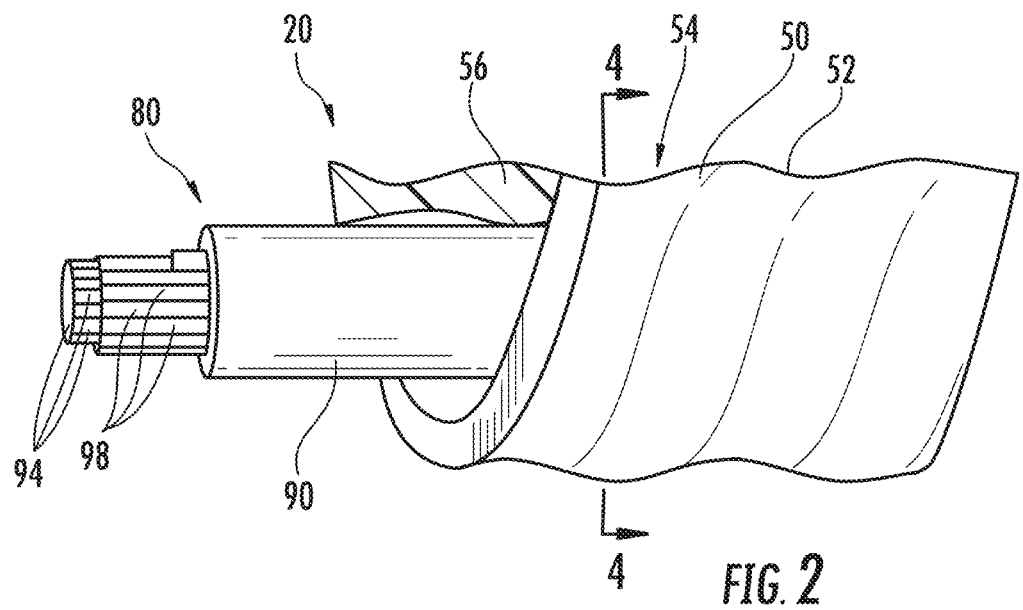
FIG. 2 is a side cut-away view of a first example embodiment of a fiber optic assembly having a dielectric armor.
Figure 3:
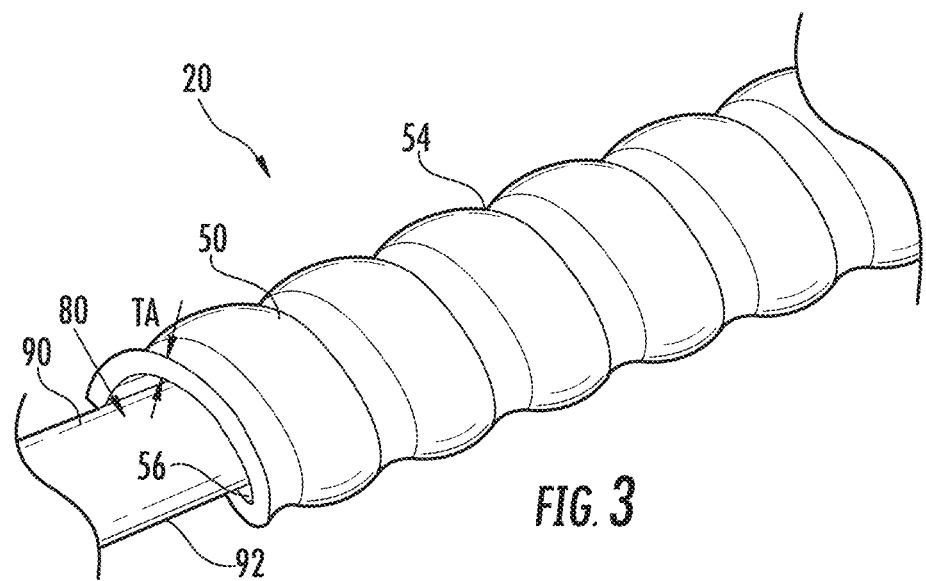
FIG. 3 is a perspective view of the armored fiber optic assembly of FIG. 2 showing a partial longitudinal cross-section of the dielectric armor.

FIG. 2 is a side cut-away view of an armored fiber optic assembly 20 having at least one optical fiber disposed within a dielectric armor 50. FIG. 3 is an enlarged perspective view of the armored fiber optic assembly 20 with a portion of the dielectric armor 50 cut away. The dielectric armor 50 is non-conductive and has an outer surface 52 having an armor profile 54 generally formed in a spiral along a longitudinal axis. An inner surface 56 of the armor 50 may also have an armor profile. As used herein, "armor profile" means that the surface has an undulating surface along its length that looks similar to conventional metal armors (e.g., a undulating shape along the length of the armor). The armor profile could, for example, also be formed by a series of spaced rings connected by depressed regions. The dielectric armor 50 is advantageous in that it both provides crush resistance and recovers to assume its original shape when subjected to crush loads. The dielectric armor 50 may also meet specified flame and/or smoke ratings, and does not require grounding.

The dielectric armor 50 is illustrated as comprising a single layer of dielectric material, with the outer surface 52 of the armor 50 being the outer surface of the assembly 20. The cost in manufacturing and materials for the assembly are accordingly low in that an exterior jacket is not required to cover the armor 50. The armor 50 may be made from a rigid or a semi-rigid material. As used herein, "rigid material" means the material has a Shore D hardness of about 65 or greater. A "semi-rigid material" has a Shore D hardness of about 55 to 64. A "non-rigid material" has a Shore D hardness of less than about 54. In some cases, materials of Shore D hardness less than 54 may be used to address issues with brittleness, flexibility, and other factors.

Still referring to FIG. 2, an inner or core fiber optic assembly 80 is housed within and protected by the dielectric armor 50. In the illustrated embodiment, the fiber optic assembly 80 is a fiber optic cable having a cable jacket 90 with an outer surface 92 and a plurality of tight-buffered optical fibers 94 extending longitudinally through the assembly 20 within the cable jacket 90. Strength elements 98, such as aramid fibers, also extend longitudinally through the interior of the cable jacket 90. The cable jacket 90 has a generally circular annular cross-section with a smooth, arcuate outer surface 92. The outer surface 92 is adjacent to the inner surface 56 of the armor 50 and contacts the inner surface 56 at various points along the length of the assembly 20. In one embodiment, the cable jacket 90 can be omitted.

By way of example, the core fiber optic assembly 80 may be a stranded tube cable, a monotube cable, a micromodule cable, a slotted core cable, loose fibers, tube assemblies, or the like. Additionally, fiber optic assemblies according to the present embodiments can include any suitable components such as water-blocking and/or water-swelling components, flame-retardant components such as tapes, coatings, or other suitable components. The fiber optic assembly 80 may have any suitable fiber count such as 6, 12 or 24-fiber MIC® cables available from Corning Cable Systems of Hickory, N.C.

In the illustrated embodiment, the armor 50 has a "continuous annular cross-section". As used herein, "continuous annular cross-section" means there are no spiral grooves, openings, cuts or slits that extend entirely through (i.e., from the inner surface 56 to the outer surface 52) the armor 50. The illustrated armor 50 also comprises a single, continuous and uniform layer.

Figure 4:
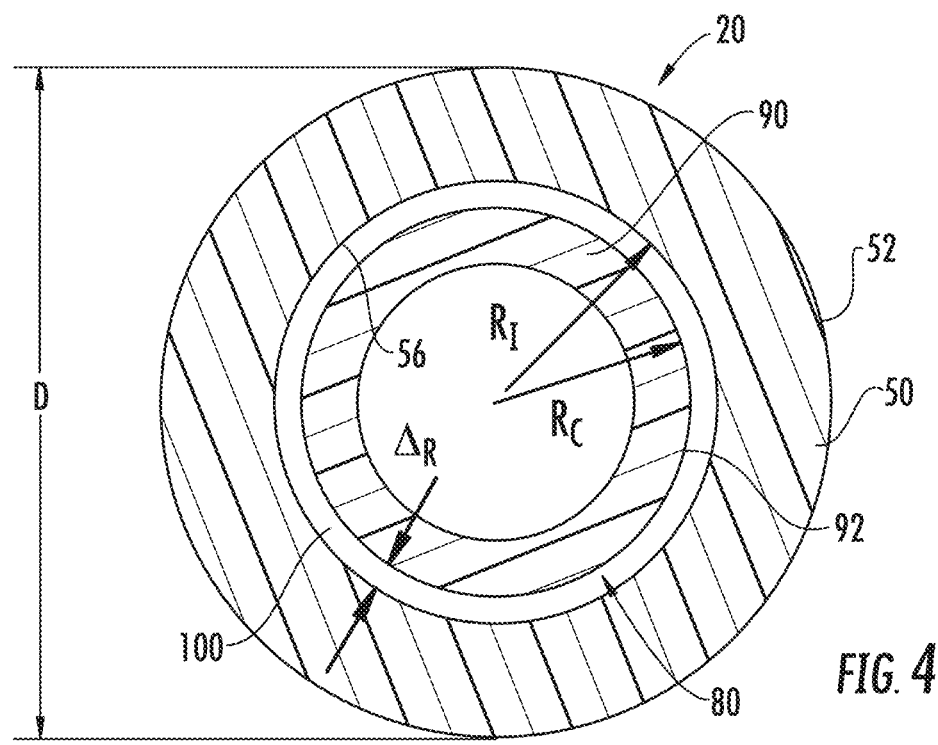
FIG. 4 is a partial cross-section of the armored fiber optic assembly of FIG. 2 taken along the line 4-4 showing only the armor and the core fiber optic assembly jacket.

FIG. 4 is a partial cross-sectional view of the armored fiber optic assembly 20 of FIG. 2 taken along the line 4-4. In FIG. 4, the optical fibers 94 and the strength members 98 are omitted so that certain dimensions of the assembly 20 can be illustrated. For simplicity in illustration, the dielectric armor 50 is depicted with a uniform circular cross-section that does not reflect the spiral undulations of the armor profile.

As shown in FIG. 4, the core fiber optic assembly 80 has an outer radius $R_C$ and the dielectric armor 50 has an average inner radius $R_I$. The inner surface 56 of the exemplary dielectric armor 50 also has an undulating armor profile, so there will be no true radius of the inner portion of the armor. The assembly 20 can include a free space 100 disposed between the outer surface of the fiber optic assembly 80 and the inner surface of the dielectric armor 50 generally represented by a separation $\Delta R$. While the separation $\Delta R$ between the cable jacket 90 outer surface 92 and the armor 50 inner surface 56 is shown as uniform around the jacket circumference, it will in fact vary along the length of the fiber optic assembly 20, and the cable jacket 90 and the armor 50 will actually contact one another at numerous points. An average or median separation $\Delta R$ can therefore be calculated as $\Delta R = R_I - R_C$. The presence of the free space 100 improves optical performance during crush events and the like as discussed below. By way of example, the average free space separation $\Delta R$ is typically about 2 millimeters or less, but free space separation $\Delta R$ values larger than 2 millimeters are possible. In one embodiment, the free space separation $\Delta R$ is between 0.1-1.0 millimeters. In a second embodiment, the free space separation $\Delta R$ is in the range of 0.2-0.8 millimeter. In the illustrated embodiment, the free space separation is about 0.5 millimeter.

Mechanical characteristics used in designing the armored fiber optic assembly 20 include minimum bend radius, impact resistance, crush-resistance, tensile strength, durability of the dielectric armor, susceptibility to plastic deformation, the ability to recover from crush loads, etc. Material characteristics such as the hardness, modulus, etc. along with geometry influence the desired characteristics/optical performance for the armored fiber optic assembly 20. For instance, the armor 50 should have a suitable modulus of elasticity. By way of example, a modulus of elasticity at 1% strain for the armor 50 is about 1200 MPa or greater.

Example 1

A fiber optic assembly as illustrated in FIG. 2 has an overall average outside diameter of about 9.2 mm, allowing for some ovality in the cross-section, an average armor 50 thickness in the range of about 1.1-1.3 mm, a cable jacket 90 thickness of about 0.8 mm, an assembly 80 outside diameter of about 6.3 mm, and a median separation ΔR in the range of about 0.25-0.5 mm. The core assembly cable jacket 90 is made from NAP 16881, and the armor 50 is made from Teknor Apex flame retarded rigid PVC available under the designation FG RE 8015B. The fiber optic assembly 80 includes 12 optical fibers of flame retarded tight-buffered fibers. The armored fiber optic assembly 20 has a weight of about 73.3 kilogram per kilometer, with the fiber optic assembly 80 accounting for about 32.2 kilogram per kilometer, and the armor 50 of the armor 50 accounting for about 41.1 kilogram per kilometer.

Example 2

A fiber optic assembly as illustrated in FIG. 2 has an overall average outside diameter of about 10.6 mm, allowing for some ovality in the cross-section, an average armor 50 thickness in the range of about 2.2-2.5 mm, a cable jacket 90 thickness of about 0.5 mm, a core assembly 80 outside diameter of about 5.2 mm, and a median separation ΔR in the range of about 0.25-0.5 mm. The core assembly cable jacket 90 is made from NAP 16881, and the armor 50 is made from flame retarded semi-rigid PVC available from AlphaGary Corporation under the designation GW 2052 S. The fiber optic assembly 80 includes 12 optical fibers of flame retarded tight-buffered fibers. The armored fiber optic assembly 20 has a weight of about 99 kilogram per kilometer, with the fiber optic assembly 80 accounting for about 23.1 kilogram per kilometer, and the armor 50 of the armor 50 accounting for about 75.9 kilogram per kilometer.

Figure 5:
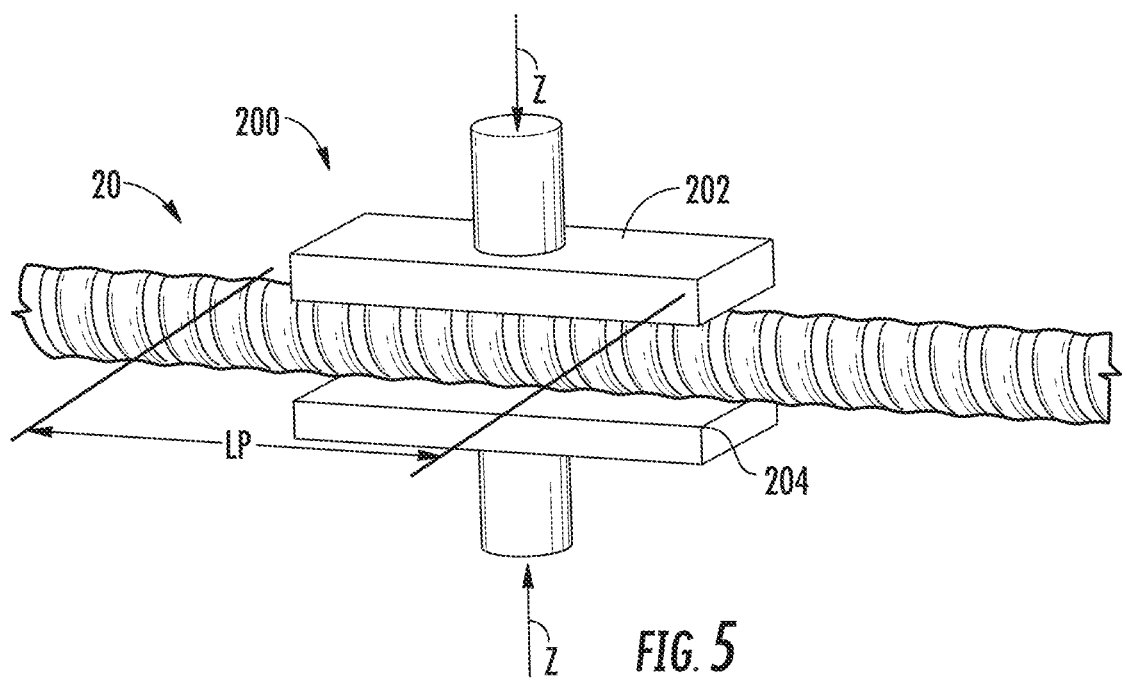
FIG. 5 illustrates a test apparatus for applying crush loads to fiber optic assemblies.

One mechanical property provided by the dielectric armor 50 is its resistance to crush under loads. FIG. 5 illustrates the fiber optic assembly 20 under crush load testing in a test apparatus 200. The test apparatus 200 includes two rigid plates 202, 204 of 10 centimeter length LP in FIG. 5. The plates 202, 204 are configured to exert compressive loads at a mid-span section of a cable. Edges of the plates 202, 204 can be rounded so that the plates do not cut into the surface of the assembly 20. The test apparatus 200 can be used to test, for example, the ability of the fiber optic assembly 20 to recover its original shape after being subjected to crush loads. While the load required to deflect the dielectric armor 50 generally is lower than metallic BX-type armors, the deformation is not as severe, and most or all of the attenuation in optical signals conveyed by the assembly 20 is relieved after removing the test load. By contrast, metallic armors deform plastically, so that they may recover little, if at all, after removing a test load. The elastic properties of the rigid dielectric material of the armor 50 allow the assembly 20 to recover generally to its original shape after crush or impact.

For PVC materials, such as Teknor Apex materials FG RE 8015A, 8015B and 8015D, and AlphaGary GW 2052 S, the elastic region along the stress/strain curve defines where the dielectric armor will return to its original shape. The elastic deformation region of the dielectric armor 50 is defined on a stress/strain curve generated from a flexural modulus test. If the elastic region is exceeded, the dielectric armor 50 yields (or plastically deforms) 180 degrees apart and may recover to an oval shape. According to one aspect of the present embodiments, the dielectric armor cable 50 has superior resistance to crush loads. According to a further aspect, even if a crush rating, such as ICEA S-83-596-2001, is exceeded, the fiber optic assembly 20 significantly or substantially wholly recovers its original shape after removal of the crush load. ICEA S-83-596-2001 covers fiber optic communications cables intended for use in buildings. Cables according to the present embodiments can also be designed to recover after testing under ICEA S-104-696, which covers fiber optic communications cables intended for indoor and outdoor use, and testing under ICEA S-87-640, which covers fiber optic communications cables intended for outdoor use.

Crush testing may cause unacceptable optical attenuation in the optical fibers 94. According to another aspect of the present embodiments, under the described test conditions, assuming none of the optical fibers 94 are damaged, attenuation caused by the crush load is relieved when the crush load is removed. By contrast, if a BX cable crush/impact rating is exceeded and the armor plastically deforms, the cable typically remains pinched resulting in a permanent attenuation step in the cable.

Fiber optic assemblies may be subjected to crush testing under extremely high loads in an apparatus as generally depicted in FIG. 5. The test procedure involves applying a crush test load (Newtons) over an axial length LP of 10 centimeters. Several different Locations along the length of the two assemblies are crush tested. The opposed plates 202, 204 apply crush loads in the "z" or "crush" direction, which is aligned with an initial, pre-crush outside diameter at each location of the assembly. Average, pre-crush outside diameters of the tested cable assemblies may be used for comparison purposes because the assemblies may have some degree of ovality in cross-section. The test begins by advancing the plates 202, 204 together in the z-direction to apply an initial crush load to the assemblies. The initial load compresses the assembly to an initial crush height. The height of the compressed assembly is assumed to be the spacing of the plates 202, 204 during crush testing. The initial crush load is applied to generally align peaks on the assembly armor profile between the plates 202, 204. The crush load is then increased to a Maximum Force (Newtons). The Maximum Force may correspond to any desired peak value. At Maximum Force, the assembly is pressed between the plates 202, 204 at a Plate Spacing at Maximum Crush (mm). The assembly is held at that load for 10 minutes. Percent of Outside Diameter at Crush percentages can be calculated as the Plate Spacing at Maximum Crush values divided by the pre-crush Outside Diameter of the assembly. This calculation indicates the degree to which the assembly is crushed from its pre-crush state. The test crush load is then released and the assembly allowed to recover for five minutes. The Cable Dimension After Recovery, now reduced in height from the original Outside Diameter, is measured in the crush or z-direction. Percent of Outside Diameter After Recovery percentages can be calculated to reflect the Cable Dimension After Recovery values divided by the pre-crush Outside Diameter of the assembly. According to one aspect of the present embodiments, rigid PVCs such as those used to form the armor 50 give substantial recovery to assemblies even after severe compression.

Those skilled in the art will appreciate the difficulty in satisfying the required mechanical, low-smoke, and/or flame-retardant characteristics etc. for armored fiber optic assemblies. The NFPA 262 plenum burn rating is especially stringent. The large combustible polymer mass of the armored fiber optic assemblies renders it difficult to meet both mechanical and flame/smoke requirements. Preferred mechanical and burn characteristics for the armor 50 are listed below in Table A.

TABLE A

| Preferred Properties for Rigid Armor Layer | | |
|---|---|---|
| Material Characteristic | Min | Max |
| Tensile (psi) | 6,000 | — |
| Tensile Modulus (psi) | 300,000 | — |
| Elongation (%) | 100% | — |
| Flexural Modulus (psi) | 300,000 | — |
| LOI | 46 | — |
| Cone Calorimeter @ 75 kW/m2 (⅛" thick specimen) | | |
| Peak Smoke (1/m) | — | 1.8 |
| Peak Heat Release (kW/m$^2$) | — | 115 |
| Average Heat Release (kW/m$^2$) | — | 72 |
| Average Heat of Combustion (MJ/kg) | — | 10 |
| Total Heat Released | — | 63 |

The semi-rigid armor material described in Example 2 may provided added flexibility in some applications. Preferred semi-rigid materials provide crush resistance and have the mechanical characteristics in Table B.

TABLE B

| Preferred Properties for Semi-Rigid Armor Layer | | |
|---|---|---|
| Material Characteristic | Min | Max |
| Tensile (psi) | 2,000 | — |
| Tensile Modulus (psi) | 3,000 | — |
| Elongation (%) | 150% | — |
| Flexural Modulus (psi) | 3,000 | — |

The embodiments discussed above describe specific materials for assembly components to meet desired mechanical and burn characteristics. In general, if intended for indoor use, the armored fiber optic assembly 20 is flame-retardant and has a desired flame-retardant rating depending on the intended space, such as plenum-rated, riser-rated, general-purpose, low-smoke zero-halogen (LSZH), or the like. Suitable materials for the dielectric armor 50 may be selected from one or more of the following materials to meet the desired rating: polyvinyl chloride (PVC), polyvinylidene fluoride (PVDF), flame-retardant polyethylene (FRPE), chlorinated polyvinyl chloride (CPVC), polytetraflourethylene (PTFE), polyether-ether keytone (PEEK), Fiber-Reinforced Polymer (FRP), low-smoke zero-halogen (LSZH), polybutylene terephthalate (PBT), polycarbonate (PC), polyethylene (PE), polypropylene (PP), polyethylene terephthalate (PETE), and aeryloni-taile butadiene styrene (ABS).

An added advantage in the use of dielectric armor is the lower weight when compared with conventional metallic BX armor designs. As shown by Example 1, the 12 fiber dielectric armor assembly 20 has a weight of about 73.3 kg/km. Comparable armored cables with metallic BX armor can weigh about 135 kg/km. The low weight of this assembly, which is less than 100 kg/km, renders the assembly easier to install.

A 6 fiber dielectric armor assembly 20 according to the present embodiments has a weight of about 62.6 kg/km, with the armor weighing about 37.1 kg/km. Comparable 6 fiber armored cables with metallic BX armor can weigh about 121.2 kg/km. The low weight of this assembly, which is less than 90 kg/km, renders the assembly easier to install.

A 24 fiber dielectric armor assembly 20 according to the present embodiments has a weight of about 115.8 kg/km, with the armor weighing about 59.8 kg/km. Comparable 24 fiber armored cables with metallic BX armor can weigh about 182.6 kg/km. The low weight of this assembly, which is less than 150 kg/km, renders the assembly easier to install.

Figure 6:
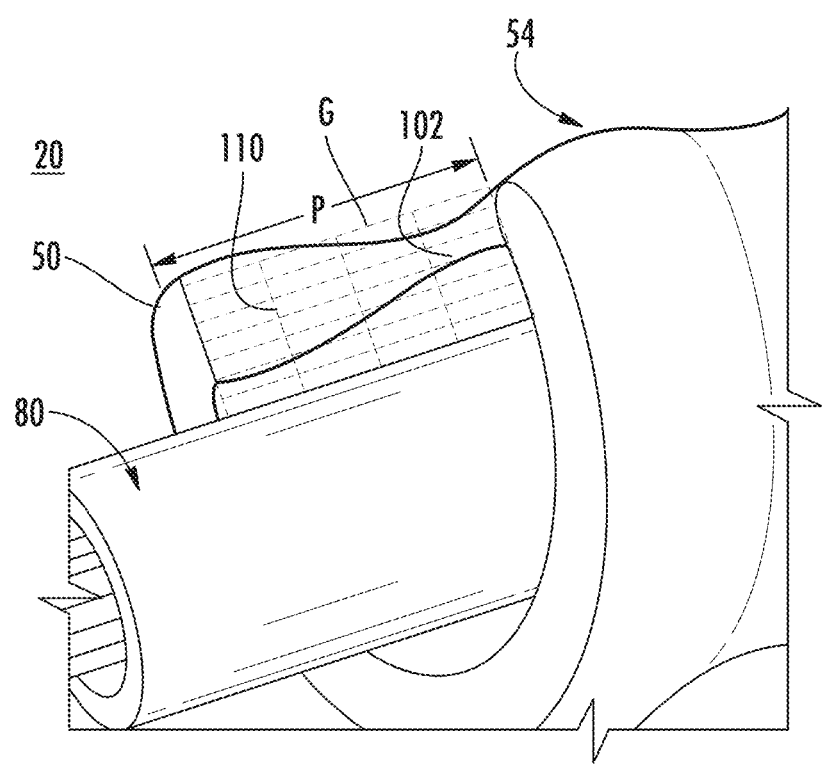
FIG. 6 is a close-up view of the armored fiber optic assembly of FIG. 2 showing a partial longitudinal cross-section of the dielectric armor superimposed on a grid for reference of the shape of the armor.

FIG. 6 illustrates a partial longitudinal cross-section of the dielectric armor 50 superimposed on a grid G for referencing the shapes of the layers. The armored profile 54 has a pitch P that includes a web 102 and a band 110. The pitch P describes a generally repeating shape that forms the armored profile 54 in a spiral manner along the longitudinal axis of the assembly 20. The geometry of the armored profile 54 is discussed below in more detail with respect to finite-element modeling performed. The armored profile 54 of this embodiment is generally formed with armor 50 having a curvilinear profile formed in a spiral along the longitudinal axis of the assembly 20. Two factors that influence the mechanical performance of the dielectric armor are geometry of the armored profile and the material characteristics of the armor 50.

Figure 7:
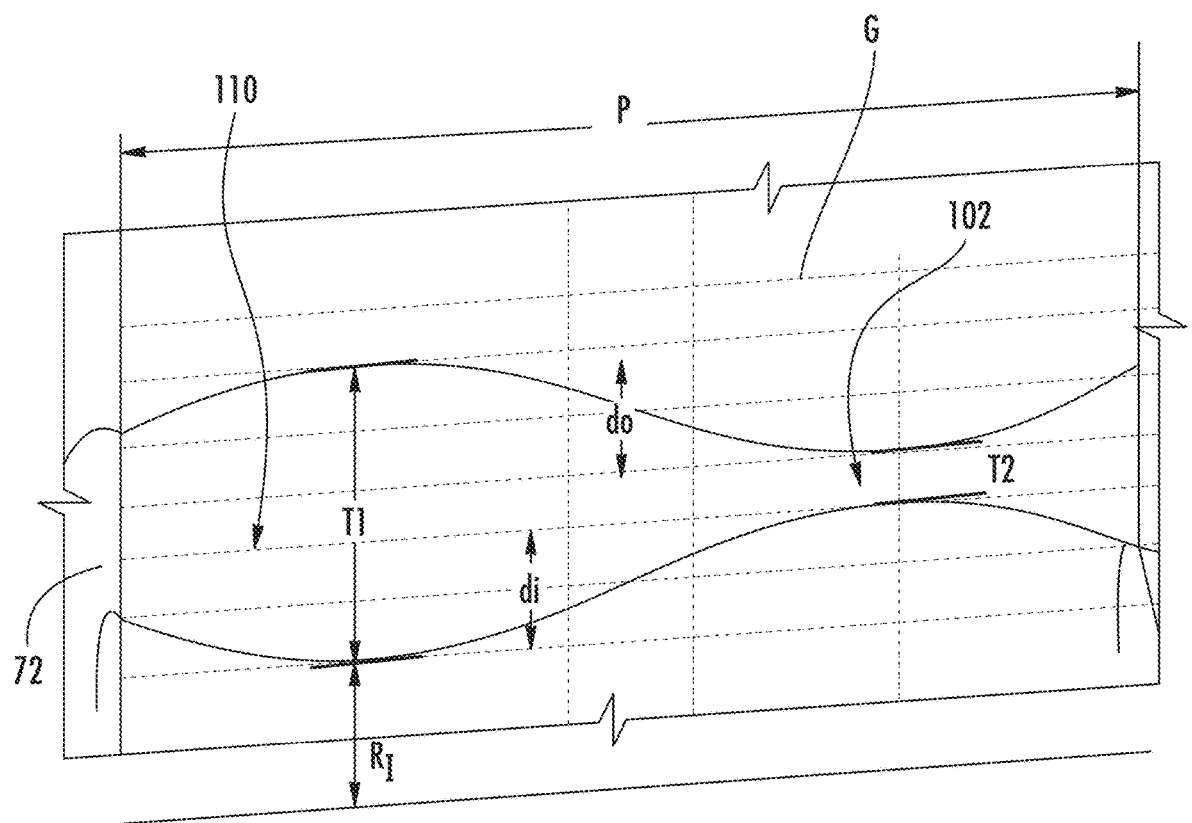
FIG. 7 is an enlarged view of a portion of the dielectric armor further showing various dimensions associated therewith.

FIG. 7 depicts an enlarged cross-sectional view of a portion of the dielectric armor 50 of FIG. 2 superimposed on grid G with certain dimensions of the armor profile shown. The dielectric armor is illustrated with a web 102 and a band 110. The armor 50 of the band 110 has a thickness T1 and the web 102 of the armor 50 has a thickness T2. On grid G, a web thickness T2 is defined as $T2 = T1 - d_O - d_i$, where an outer groove depth $d_O$ is the height difference between the band 110 and the web 102 of the armor 50, and an inner groove depth $d_i$ is the height difference between the band 110 and the web 102 of the armor 50. A total groove depth $d_O + d_i$ is the sum of the outer groove depth $d_O$ and inner groove depth $d_i$. The dielectric armor 50 has an inner radius $R_I$ and an outer radius that is equal to $R_I + T_1$.

Figure 8:
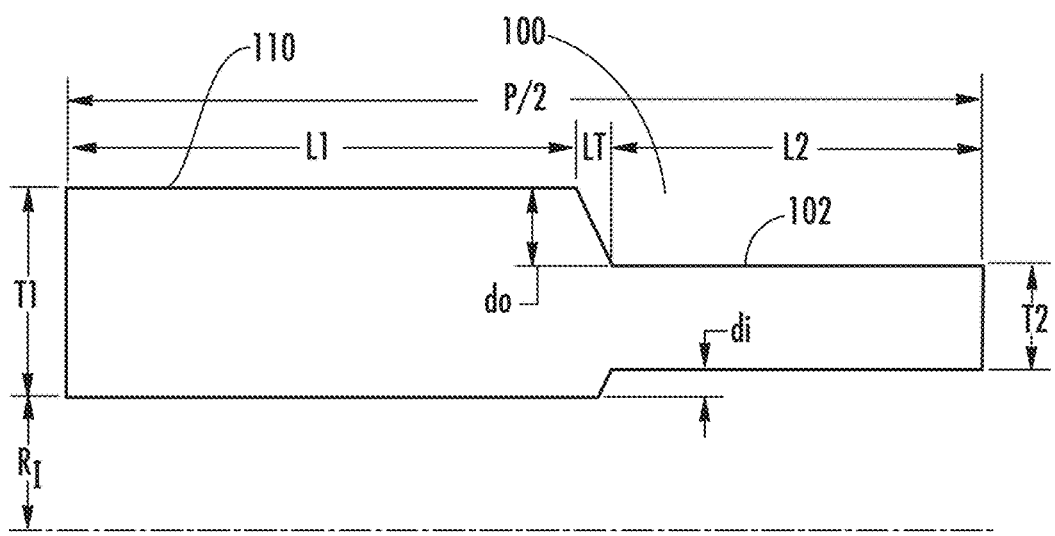
FIG. 8 is an enlarged perspective view of a portion of a generic armored profile showing the geometry used for finite-element modeling of the dielectric armor.

FIG. 8 is an enlarged perspective view of a portion of the layer of the dielectric armor 50 having the armor profile showing generic geometry/dimensions used for finite-element modeling of the armor. FIG. 8 depicts an armor profile that is shaped very closely to a step profile, which provides excellent mechanical characteristics when the proper geometry is selected. However, in practice it is difficult to manufacture a step armor profile at relatively high line speeds as shown in FIG. 8. Consequently, the manufactured dielectric armor has a rounded or sloped profile as shown in FIG. 7.

FIG. 8 depicts one-half pitch P/2 for the armored profile (i.e., the one-half pitch P/2 only depicts a fraction of the web 102 and a fraction of the band 110. The one-half pitch P/2 of the armor profile has a length given by the sum of length L1 (i.e., the fractional portion of the band), length $L_T$ (i.e., a transitional portion between the band and web), and length L2 (i.e., the fractional portion of the web). Additionally, for the purpose of simplicity only the layer with the armor profile of the dielectric armor is modeled since it contributes to the majority of the mechanical characteristics for the dielectric armor. Consequently, the web 102 has a length referred to as a groove length 2(L2) herein, which is two times the length L2.

Figure 9:
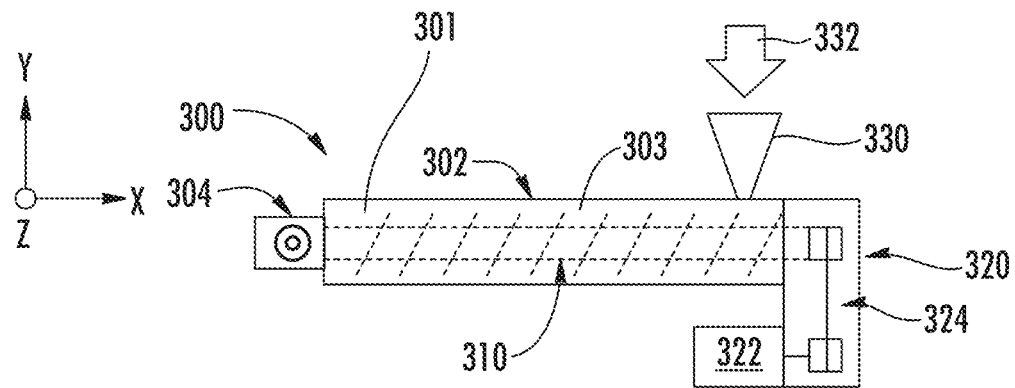
FIG. 9 is a schematic diagram of an explanatory extrusion system for making dielectric armor.

The dielectric armor 50 can be formed by extrusion. FIG. 9 depicts a schematic side view of an extrusion system 300 that includes an extruder 302 having an interior 301, with a barrel 303 and a screw 310 in the interior 301 and attached to a crosshead assembly ("crosshead") 304. X-Y-Z Cartesian coordinates are included for spatial reference, with FIG. 9 illustrated in the X-Y plane. The extruder 302 includes a screw 310 that is mechanically connected to and driven by a motor assembly 320. The motor assembly 320 includes a motor 322 and a drive system 324 that connects the motor to the screw 310. A material hopper 330 provides extrusion material 332—here, the dielectric material that ultimately makes up dielectric armor 50—to the extruder 302. U.S. Pat.

No. 4,181,647 discloses an exemplary extrusion system that is suitable for adaptation for use as the extrusion system 300.

Figure 10:
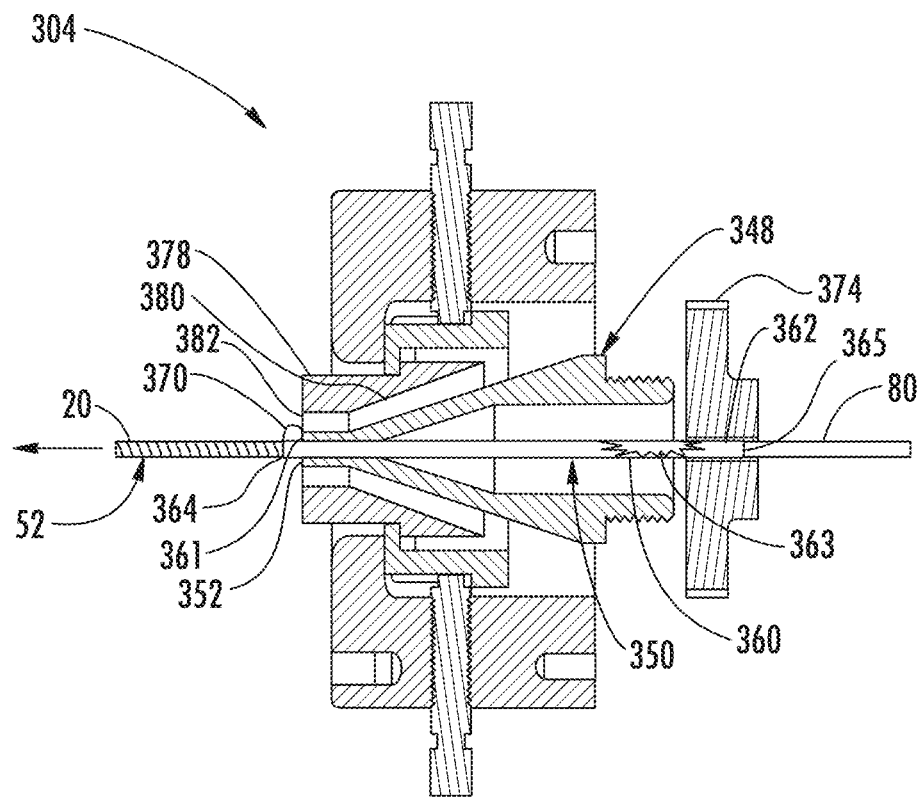
FIG. 10 is a schematic cross-sectional view of the crosshead of the extrusion system of FIG. 9.

FIG. 10 is a close-up, partial cross-sectional schematic view of an explanatory crosshead 304 as viewed in the Y-Z plane. The crosshead 304 includes a tip 348 having a central channel 350 with an output end 352 and in which is arranged a profile tube 360 having an outer surface 361, an inner surface 362 that defines a tube interior 363, a proximal (output) end 364, and a distal end 365. A profiling feature 370 is located on outer surface 361 at output end 352. In an example embodiment, the profiling feature 370 is a protrusion such as a nub or a bump. The profile tube interior 363 is sized to accommodate the fiber optic assembly 80 as it advances axially through the interior 363. The profile tube distal end 365 is centrally engaged by a gear 374 that, in turn, is driven by a motor (not shown) in a manner such that the profile tube 360 rotates within channel 350.

The crosshead 304 further includes a die 378 arranged relative to the tip 348 to form a cone-like material channel 380 that generally surrounds the central channel 350 and that has an output end 382 in the same plane as channel output end 352. The material channel 380 is connected to the extruder interior 301 so as to receive extrusion material 332 therefrom and through which flows the extrusion material during the extrusion process to form one the dielectric armor. In the example embodiment of the crosshead 304 of FIG. 10, a profile tube output end 365 extends beyond the channel output end 352 such that the profiling feature 370 thereon resides adjacent material channel output end 382. In an example embodiment, the profile tube 360 and the tip 348 are integrated to form a unitary, one-piece tool.

In forming armored fiber optic assemblies 20, extrusion material (not shown) flows through the material channel 380 and out of the material channel output end 382. At the same time, the fiber optic assembly 80 is fed through the profile tube interior 363 and out of profile tube output end 364 (and thus through the tip 348 and the die 378). In the meantime, the profile tube 360 is rotated via the gear 374 so that profiling feature 370 redirects (i.e., shapes) the flow of the extrusion material as it flows about fiber the optic assembly 80. As the fiber optic assembly 80 moves through the profile tube output end 364, the circular motion of the profiling feature 370 diverts the flow of extrusion material. The combined motion of the profiling feature 370 and the linear motion of fiber optic assembly 80 forms the armored profile. The speed at which profile tube 360 rotates relative to the motion of fiber optic assembly 80 (which may also be rotating) dictates the pitch of the armor profile. All other factors being equal, a higher rotational speeds for the profiling feature 370 results in a shorter pitch for the armor profile. The size and shape characteristics of the profiling feature 370 dictate, at least in part, the particular armor profile imparted to the outer surface 52 of the dielectric armor 50. Though the extrusion flow is primarily diverted on the interior of the armor, the drawdown of the material moves the groove partially or completely to the outer surface of the armor. Of course, this type of extrusion set-up may be used on any desired layer of the dielectric armor.

According to one aspect of the present embodiment, forming the armor from a single layer of dielectric material, and omitting an exterior cable jacket, saves in cost and in processing time. For example, lines speeds for forming the armor 50 for a cable assembly as illustrated in FIGS. 2 and 3 can be in the range of 12 meters per minute. A jacketing process might be performed at 24 meters per minute. Omitting the jacketing step accordingly reduces the armoring processes by roughly one third. The dielectric material used to form the armor can be colored to provide a desired appearance, and the exterior of the armor can be suitable for printing.

Figure 11:
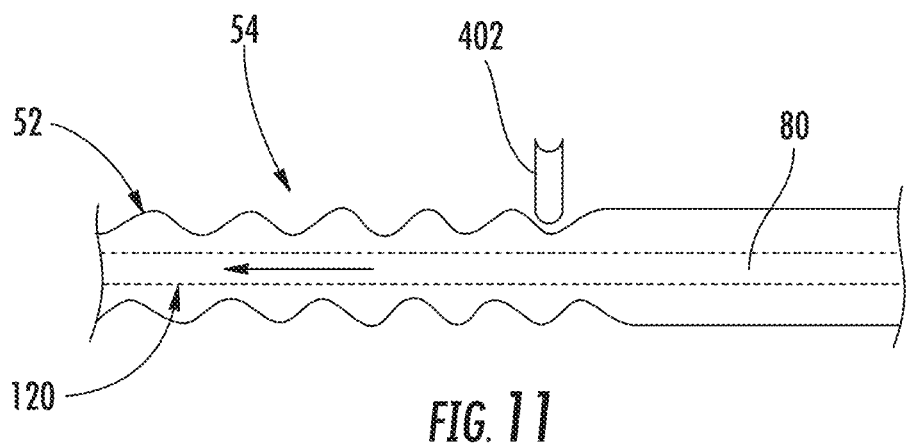
FIG. 11 is a schematic side view illustrating another method of forming dielectric armor.

There are other suitable methods for forming the armor profile. By way of example, FIG. 11 schematically illustrates the dielectric armor 50 initially being extruded as a smooth-surfaced tube (i.e., having a smooth outer surface as shown on the right side). Thereafter, the armor profile 54 of the outer surface 52 is then formed in the smooth-surfaced tube, prior to hardening, by the application (e.g., pressing) of a deforming member 402 (e.g., a nub or a finger) into the layer so as to shape outer surface 52 in a manner similar to that used in a lathe. In this example, the deforming member 402 may simply divert material from the web to the band, or it may remove material entirely from the dielectric armor 50. In one example embodiment, the deforming member 402 is stationary and the assembly 20 is rotated, while in another example embodiment, the deforming member 402 rotates around the dielectric armor 50 as it advances axially. In still another example embodiment, both the dielectric armor 50 and the deforming member 402 rotate. The deforming member 402 may also be integrated into the extrusion tooling (die).

Figure 12:
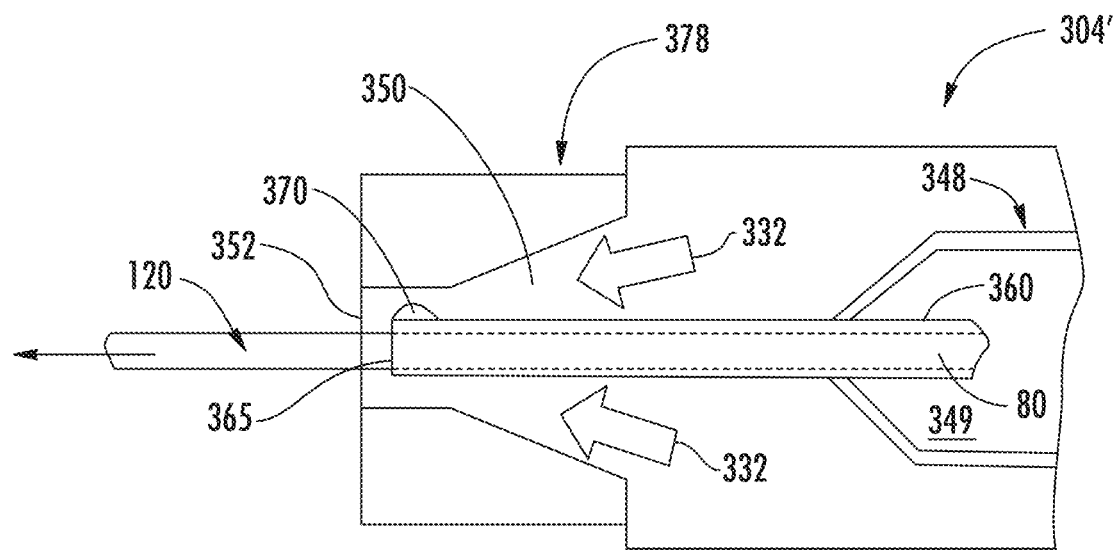
FIG. 12 is a partial, cross-sectional view of another explanatory example of a crosshead wherein the profiling feature is within the crosshead die.

FIG. 12 is a close-up, schematic cross-sectional view of another explanatory embodiment of crosshead 304' similar to that shown in FIG. 10. In FIG. 12, the tip 348 and the die 378 are configured so that central channel 350 is combined with the material channel through which the extrusion material flows. A portion of the profile tube 360 resides in an interior region 349 of the tip 348, while the proximal end portion of the profile tube resides within the channel 350 so that the profiling feature 370 resides within central channel 350 adjacent to the channel output end 352. This geometry confines the extrusion material 332 within the die 378 while allowing for control of the flow of extrusion material.

Figure 13:
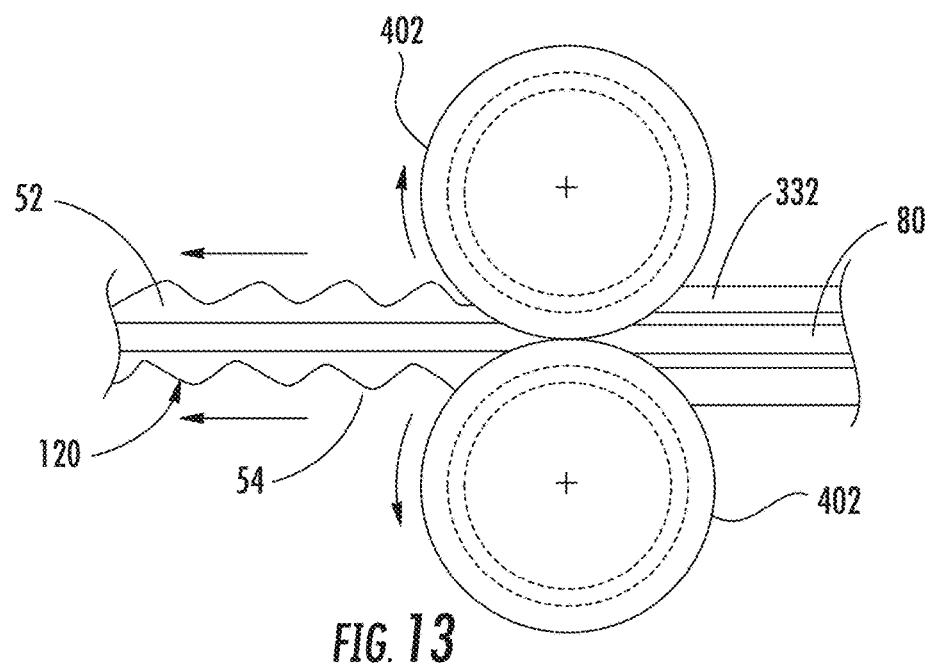
FIG. 13 is a side view of an example extrusion system wherein the profiling feature is located external to the crosshead and impresses the profile into the dielectric armor.
Figure 14:
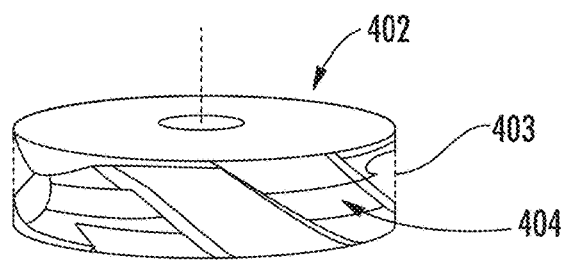
FIG. 14 is a perspective view of an example roller-type deforming member that is used to impress the armor profile into the dielectric armor.

In another explanatory embodiment similar to that shown in FIG. 11 and as illustrated in FIGS. 13 and 14, the dielectric armor is initially extruded as a smooth-surfaced tube (i.e., having a smooth outer surface on the right-side) of dielectric extrusion material 332. The armor profile 54 of the outer surface 52 is then formed prior to hardening, by the application (e.g., pressing) of a deforming member 402 (e.g., a set of gears) having one or more features 404 that press into the dielectric armor in order to shape the outer surface 52. FIG. 14 shows a perspective view of an exemplary embodiment of a roller-type deforming member 402 having an outer edge 403 in which features 404 are formed. In this embodiment, the deforming member 402 of FIG. 13 may be formed in sets of two, three, four, or more for forming the desired armor profile. The roller-type deforming member 404 rolls over the outer surface 52 of the dielectric armor before it hardens to impress features 404 of the armor profile.

Figure 15:
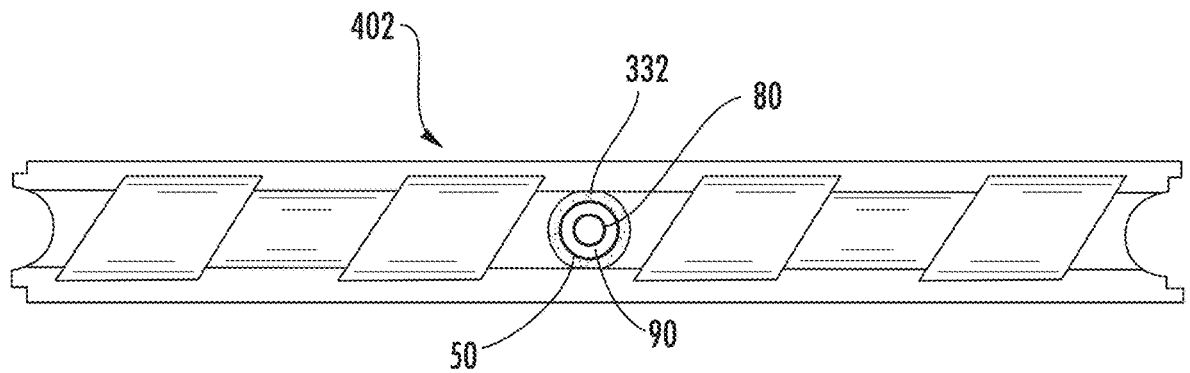
FIG. 15 is a front view illustrating the use of two roller-type deforming members to impress the armor profile into the dielectric armor.

The deforming member 402 may press extrusion material 332 against the fiber optic assembly 30 to eliminate free space 100. The deforming member 402 may also press against the dielectric armor 50 in a manner that maintains the desired amount of free space 100. FIG. 15 is a front view that illustrates the use of two roller-type deforming member to impress the desired armor profile into the dielectric armor.

Example 3

A fiber optic assembly as illustrated in FIG. 2 has an overall average outside diameter of about 7.4 mm, allowing for some ovality in the cross-section, a band thickness of 1.1 mm, a web thickness of 0.8 mm, a median separation ΔR of 0.38 mm, a core assembly outside diameter of 4.45 mm, with six optical fibers in the core assembly.

Example 4

A fiber optic assembly as illustrated in FIG. 2 has an overall average outside diameter of about 8.2 mm, allowing for some ovality in the cross-section, a band thickness of 1.1 mm, a web thickness of 0.8 mm, a median separation ΔR of 0.40 mm, a core assembly outside diameter of 5.2 mm, with twelve optical fibers in the core assembly.

Example 5

A plenum-rated fiber optic assembly as illustrated in FIG. 2 has an overall average outside diameter of about 10.5 mm, allowing for some ovality in the cross-section, a band thickness of 1.3 mm, a web thickness of 0.9 mm, a median separation ΔR of 0.40 mm, a core assembly outside diameter of 6.65 mm, with 24 optical fibers in the core assembly.

It is intended that the present invention cover the modifications and variations of this invention, provided they come within the scope of the appended claims and their equivalents.

We claim:

1. An armored fiber optic assembly, comprising:
at least one optical fiber;
an inner jacket surrounding the at least one optical fiber; and
an armor surrounding the inner jacket, the armor comprising an inner surface and an outer surface;
wherein the armor is formed from a single layer of dielectric material;
wherein the armor has a thickness that varies along a length of the armor and that defines an undulating shape along a length of the outer surface of the armor;
wherein the outer surface of the armor defines an outer surface of the armored fiber optic assembly, and
the inner surface of the armor contacts an outer surface of the inner jacket.

2. The armored fiber optic assembly of claim 1, wherein the variable thickness of the armor also defines an undulating shape along a length of the inner surface of the armor.

3. The armored fiber optic assembly of claim 2, wherein the armored fiber optic assembly has a median separation in a range of about 0.1-1.5 millimeters between an outer surface of the inner jacket and the inner surface of the armor.

4. The armored fiber optic assembly of claim 1, wherein the armor has a continuous annular cross-section and is formed from a single, continuous and uniform dielectric material layer.

5. The armored fiber optic assembly of claim 4, wherein the armor has a Shore D hardness of 65 or greater.

6. The armored fiber optic assembly of claim 1, wherein the undulating shape defines an armor profile that has a pitch P between about 5 millimeters and about 30 millimeters and a groove length that is between about 20 percent and 80 percent of the pitch P.

7. The armored fiber optic assembly of claim 1, wherein the armor has a modulus of elasticity of about 1200 MPa or greater.

8. The armored fiber optic assembly of claim 1, wherein the armor has an outside diameter in a range of 7-15 mm.

9. An armored fiber optic assembly, comprising:
a fiber optic assembly having at least one optical fiber and a jacket; and
a single-layer dielectric armor surrounding the fiber optic assembly, the dielectric armor consisting essentially of a rigid PVC layer with an armor profile and a continuous annular cross-section, the PVC layer having a tensile modulus of at least 300,000 psi, wherein the jacket contacts the dielectric armor, wherein a outer surface of the dielectric armor defines a outer surface of the armored fiber optic assembly.

10. The armored fiber optic assembly of claim 9, wherein the fiber optic assembly includes 6 optical fibers and the dielectric armor weighs less than 90 kg/km.

11. The armored fiber optic assembly of claim 9, wherein the fiber optic assembly includes 12 optical fibers and the dielectric armor weighs less than 100 kg/km.

12. The armored fiber optic assembly of claim 9, wherein the fiber optic assembly includes 24 optical fibers and the dielectric armor weighs less than 150 kg/km.

13. The armored fiber optic assembly of claim 9, wherein the dielectric armor has an outside diameter in a range of 7-15 mm.

14. The armored fiber optic assembly of claim 9, wherein the armored fiber optic assembly has a median separation in a range of about 0.1-1.5 millimeters between the fiber optic assembly and an interior surface of the dielectric armor, and wherein the armor profile has a pitch P between about 5 millimeters and about 30 millimeters and a groove length that is between about 20 percent and 80 percent of a pitch P.

15. The armored fiber optic assembly of claim 9, wherein the dielectric armor has a modulus of elasticity of about 1200 MPa or greater.

16. An armored fiber optic assembly, comprising:
a fiber optic assembly having at least one optical fiber and a jacket surrounding the at least one optical fiber; and
an armor formed from a single layer of dielectric material surrounding the fiber optic assembly, the armor comprising an armor profile and a continuous annular cross-section;
wherein the jacket contacts the armor, and
the armor profile has a pitch P between about 5 millimeters and about 30 millimeters and a groove length that is between about 20 percent and 80 percent of a pitch P.

17. The armored fiber optic assembly of claim 16, wherein the fiber optic assembly includes at least 24 optical fibers and the armor weighs less than 150 kg/km.

18. The armored fiber optic assembly of claim 16, wherein the armor is a continuous and uniform dielectric material layer.

19. An armored fiber optic assembly, comprising:
a fiber optic assembly having at least one optical fiber and a jacket; and
a single layer dielectric armor of continuous annular cross-section surrounding the fiber optic assembly and having an inner surface and an outer surface, the dielectric armor having an armor profile with an outside diameter in a range of 7-15 millimeters and a Shore D Hardness in a range of 55-64;
wherein the armored fiber optic assembly has a median separation in a range of about 0.1-1.5 millimeters between the fiber optic assembly and an interior surface of the dielectric armor;
wherein the outer surface of the dielectric armor defines the outer surface of the armored fiber optic assembly; and
wherein the inner surface of the dielectric armor contacts the jacket.

20. The armored fiber optic assembly of claim 19, wherein the armor profile has a pitch P between about 5 millimeters and about 30 millimeters and a groove length that is between about 20 percent and 80 percent of a pitch P.

* * * * *